April 29, 1969     W. E. HAYES ET AL     3,440,876

FLOWMETER FREQUENCY CONTROL SYSTEM

Filed Oct. 31, 1966

WITNESSES:

INVENTORS
William E. Hayes and
Charles D. Calhoon.
BY
ATTORNEY

United States Patent Office 3,440,876
Patented Apr. 29, 1969

3,440,876
FLOWMETER FREQUENCY CONTROL SYSTEM
William E. Hayes, Laurel, and Charles D. Calhoon, Catonsville, Md., assignors to Westinghouse Electric Corporation, Pittsburgh, Pa., a corporation of Pennsylvania
Filed Oct. 31, 1966, Ser. No. 590,618
Int. Cl. G01f 1/00
U.S. Cl. 73—194                             6 Claims

ABSTRACT OF THE DISCLOSURE

A control system which compensates for changes in the speed of sound in a fluid flow measuring system which utilizes opposed upstream and downstream transducers projecting, in transmission cycles, acoustic pulses towards one another. A variable frequency oscillator provides pulses to a counter for a period of time $\Delta T$ equal to the difference in transit times of the acoustic pulses traveling between upstream and downstream transducers. A first counter counts up the VFO output and provides a marker signal indicative of a received pulse in the absence of any fluid velocity. Another counter means stores a count indicative of one half the count in the $\Delta T$ counter and is provided with the VFO output such that when full it will provide a comparison signal when the $\Delta T$ counter is half full. The marker and comparison signals are utilized to control the frequency of the VFO.

---

This invention in general relates to flowmeter apparatus for measuring fluid velocity, and more particularly to an improved control system for accurately compensating for changes in the speed of sound in the fluid under measurement.

A wide variety of flowmeter systems include an upstream transducer station and a downstream transducer station communicative with the fluid under measurement, and wherein acoustic energy is simultaneously transmitted to both transducer stations. In the absence of fluid flow the time it takes for the acoustic energy to travel from the transmitter to the downstream transducer station is $T_D = L/C$, where $T_C$ is the time, L is the distance from transmitter to the downstream transducer station, and C is the speed of sound in the fluid. Similarly, the time it takes for the acoustic energy to travel to the upstream transducer is $T_U = L/C$ where L is the distance between the transmitter and upstream transducer station and C is the speed of sound in the fluid. For accuracy and convenience, the upstream and downstream transducer stations simultaneously project acoustic energy towards one another so that in both cases the L term is the same. If a downstream velocity is now imparted to the fluid, acoustic energy traveling downstream will be aided by the velocity and the acoustic energy traveling upstream will be retarded by the velocity and the above equations are modified so that $$T_D = \frac{L}{C+V}$$

and $$T_U = \frac{L}{C-V}$$

where V is the velocity of the fluid. The difference in acoustic travel time upstream and downstream, $T_U - T_D$, is $$\frac{2LV}{C^2 - V^2}$$

and since $C^2$ is in practice, much larger than $V^2$ the right hand side of the equation reduces to $2LV/C^2$. With a known L and a known C therefore, it is seen that the velocity of the fluid is proportional to the difference in transmit times of the upstream and downstream acoustic energy. A problem arises however in that the speed of sound, in actuality, is not constant but varies with the mineral content and temperature of the fluid being measured and therefore in such flowmeter systems means are provided to compensate for the varying speed of sound.

One type of compensating scheme utilized a variable frequency oscillator (VFO) and a counter device which was responsive to the VFO output for providing a marker output signal when a certain count was reached. The provision of this marker pulse was obtained by initially choosing a nominally correct speed of sound, determining how long it should take acoustic energy to travel the distance between transducer stations in the absence of fluid velocity, and knowing the frequency of the VFO, the marker pulse should occur at the same time the acoustic energy is received, and the count in the counter was an indication of this situation. The VFO also fed a time interval counter which turned on when the downstream acoustic energy was received and provided a first received pulse or signal and turned off when the upstream acoustic energy was received and provided a second received pulse or signal, and the count in the time interval counter was indicative of the fluid velocity. In order to control the frequency of the VFO, the marker pulse was compared with the first received signal. The first received signal however is indicative of $$\frac{L}{C+V}$$

whereas the marker pulse is indicative of $L/C$, without the V term. At a low velocity V the two terms are almost equal but any high flow capability of the system is greatly impaired. From an engineering standpoint practical limits would be a water velocity of approximately 10 to 15 feet per second.

It is therefore one object of the present invention to provide a system of the type described wherein correction for varying speeds of sound is accurately made.

A further object is to provide a system of the type described wherein compensation for variances in the speed of sound may be made at higher water velocities than heretofore.

A further object is to provide a system of the class described which is self-compensating for varying fluid velocities.

Briefly, in accordance wtih the above objects, the broad concept of the invention comprises, in a system of the type described, a variable signal source and first circuit means responsive to the output of the signal source for providing, during an Nth transmission cycle, a marker signal which is indicative of a received pulse, in the absence of any fluid velocity. A second circuit means is responsive to the signal source and to the first and second received pulses to obtain a first signal indicative of the difference in time occurrence $\Delta T$ of the first and second received signals during the Nth transmission cycle. Additional circuit means stores a second signal which is indicative of one half the first signal during the same transmission cycle for comparison with a marker signal in a subsequent cycle such that when the subsequent marker signal is provided the time occurrence of that marker signal is compared with an indication of the second signal (the signal indicative of one half of $\Delta T$) for controlling the variable signal source.

The objects and the basic concepts are accomplished in the present invention, one illustrative embodiment of which comprises as the variable signal source, a variable frequency oscillator (VFO) which provides an output signal, and a first counter means which is operable to provide a marker pulse output signal when a predetermined count is attained. A second counter means responsive to the VFO output and the respective first and second received pulses provides a count indicative of the difference in time occurrence of the respective received pulses. A transfer means is provided for transferring to a third counter means signals indicative of half the count in the second counter and during a subsequent transmission cycle, the third counter means receives the output from the VFO and when full, will provide an output signal which is compared in time occurrence with the marker pulse output signal to control the frequency of the VFO.

The above stated as well as further objects and advantages of the present invention will become apparent upon a reading of the following detailed specification taken in conjunction with the drawings in which.

Figure 1:
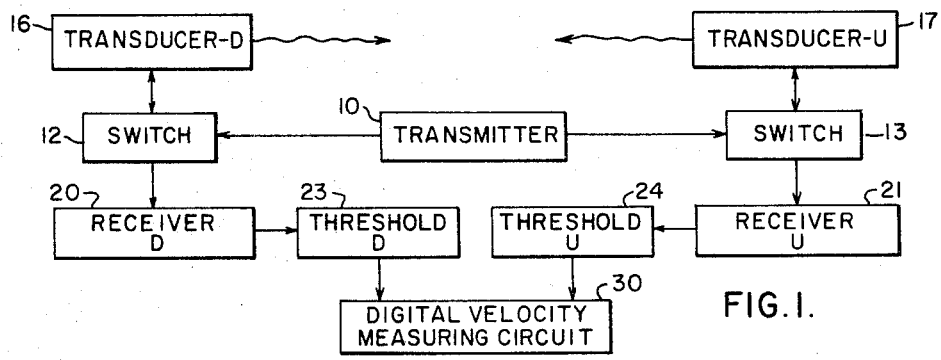
FIG. 1 illustrates, in block diagram form, a typical fluid velocity measuring system in which the present invention may be used.

Referring now to the typical flowmeter system of FIG. 1, there is illustrated a transmitter 10 which, during periodic transmission cycles, supplies electrical energy through switches 12 and 13 to downstream and upstream transducer stations 16 and 17 respectively. For convenience and to enhance accuracy each transducer station may comprise only one transducer which is operable to send an acoustic signal to its opposing transducer and will provide a corresponding output signal when acoustic energy impinges upon the transducer. The acoustic energy received by the downstream transducer 16 is conducted through switch 12 to receiver 20 and the signal provided by transducer 17 as a result of the acoustic energy produced by transducer 16 is conducted through switch 13 to receiver 21. Threshold devices 23 and 24 are responsive to the output of the receivers 20 and 21, respectively, for providing pulses, herein termed received pulses, indicative of the difference in travel time of the acoustic energy provided by transducers 16 and 17.

In the absence of fluid velocity, the acoustic energy provided by transducer 16 arrives at transducer 17 at the same time that the acoustic energy provided by transducer 17 arrives at transducer 16 and therefore the first and second received pulses provided by threshold devices 23 and 24 occur simultaneously. With a velocity imparted to the fluid under measurement (in an upstream to downstream direction), the acoustic signal will arrive at transducer 16 first since it is aided by the fluid velocity and the acoustic signal will arrive at transducer 17 at a later point in time since it is retarded by the fluid velocity and therefore threshold device 23 will provide a first received pulse and threshold device 24 will provide a second received pulse thereafter with the difference in times of occurrence between the first and second pulses being indicative of the fluid velocity in accordance with the previously given equation $$T_U - T_D = \Delta T = \frac{2LV}{C^2}$$

Velocity measuring circuits generally designated 30 are provided and are responsive to the first and second received pulses in order to provide an indication of fluid velocity.

Figure 2:
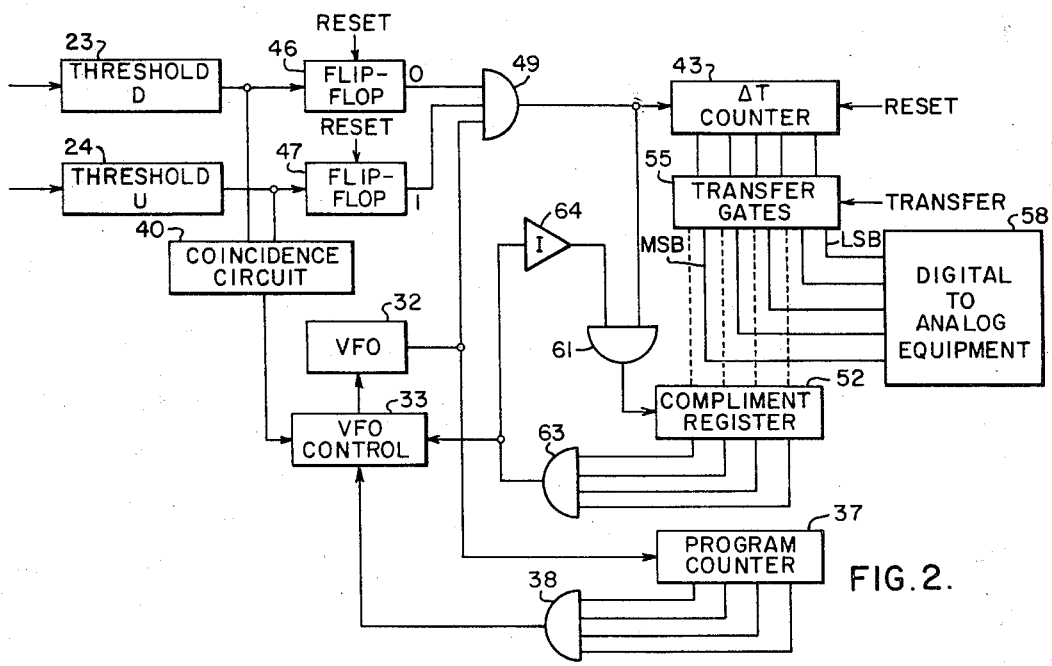
FIG. 2 is a block diagram illustrating the operation of the present invention in conjunction with a fluid velocity measuring system.

FIG. 2 illustrates some of the components which may be used in the velocity measuring circuits block 30 of FIG. 1. In FIG. 2, as is done in various other prior art arrangements, there is provided a variable frequency oscillator (VFO) 32 whose output frequency is governed by a VFO control means 33. The output signal from the VFO 32 may be in the form of a square wave, pulses, or any other periodic waveshape, the cycles of which may be counted by a digital counter. The VFO output is fed to a first counter means in the form of a program counter 37 which will provide an output signal called a marker pulse when a predetermined count is attained. The marker pulse is used to aid in the governing of the frequency of the VFO 32, and in essence is operable to correct for changes in speed of sound in the absence of fluid velocity. This is accomplished by initially assuming a correct speed of sound $C_a$. In the absence of fluid velocity the first and second received signals occur simultaneously at sometime T after transmission and from the previously discussed equation, $T = L/C_a$. Knowing the frequency of the VFO 32 the program counter 37 will attain a certain count after the period of time $T = L/C_a$ and this particular count may be sensed by the AND gate 38 which provides the aforementioned marker pulse when the predetermined count is reached. In the absence of fluid velocity the first received pulse occurs simultaneously with the second received pulse and means such as coincidence circuit 40 may be provided in order to detect this simultaneous occurrence. Therefore the output of the coincidence circuit 40 occurs simultaneously with the marker pulse from AND gate 38 (suitably correcting for circuit time delays) if the actual speed of sound is equal to the assumed speed of sound. If there is equality, the output of coincidence circuit 40 and the marker pulse are received simultaneously by the VFO control means 33 and no correction is made to the output frequency of the VFO 32. If, however, the speed of sound increases (and still assuming zero fluid velocity) the output of coincidence circuit 40 will occur before the occurrence of marker pulse from AND gate 38. This difference in occurrence is sensed by the VFO control means 33 to correct the frequency of the VFO 32 accordingly to increase its output frequency so that the predetermined count in the program counter 37 is reached in a faster time than originally attained so that the marker pulse will be provided to coincide with the output of circuit 40. If the speed of sound in the fluid should decrease, the marker pulse occurs first and the VFO control means 33 decreases the frequency of the VFO 32. It is therefore seen that the frequency of the VFO 32 is automatically controlled to vary in accordance with the variance in speed of sound in the fluid.

In the presence of fluid velocity, the first and second received pulses do not occur simultaneously and in prior art systems the marker pulse occurrence was compared with the occurrence of the first received signal to control the VFO. The first received signal however has a velocity component V (in the equation $$T = \frac{L}{C+V}$$

If the velocity is extremely low, the V term may be neglected so that comparison of the marker pulse with the first received signal would be almost analogous to the comparison of the marker signal with a signal provided in the absence of fluid velocity (that is, a signal such as provided by coincidence circuit 40). However, for high velocities the V term does not become insignificant and a serious error is introduced into a final velocity reading. In other words for fluid velocities greater than about 10 to 15 feet per second the prior art method of comparing a marker pulse with the first received signal does not result in accurate velocity readings.

In the present invention the marker pulse is compared with a signal which is generated midway between the times of arrival of the received pulses.

Figure 3A:
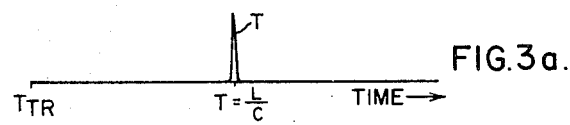
FIGS. 3a and 3b illustrate the time occurrence of certain signals in the operation of the system.
Figure 3B:
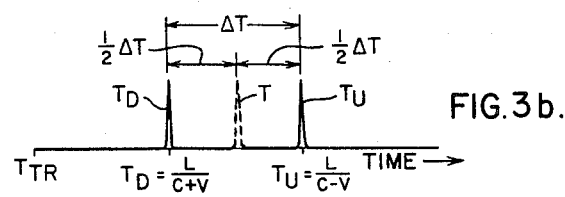

FIGS. 3a and 3b illustrate time scales to aid in an understanding of this operation. For convenience time delays associated with various circuits have been neglected.

In FIG. 3a at time $T_{TR}$ an acoustic pulse is transmitted by transducers 16 and 17 (FIG. 1) toward one another, At some finite time later, and with zero fluid velocity, the acoustic energy results in a pulse T with the time occurrence of the pulse being equal to $L/C$. Pulse T therefore represents the first received pulse or the second received pulse since with no fluid velocity, the transit time of the oppositely directed acoustic pulses will be the same upstream as downstream.

With a fluid velocity, FIG. 3a is modified as illustrated in FIG. 3b. At time $T_{TR}$ an acoustic transmission takes place. With a fluid velocity, in an upstream to downstream direction, the pulse $T_D$ occurs first and is equal to $L/C$ plus the velocity component V, that is $$T_D = \frac{L}{C+V}$$

At some finite time later the pulse $T_U$ occurs and is equal to $L/C$ minus the velocity component V, that is $$T_U = \frac{L}{C-V}$$

The difference in time occurrence of the two pulses is $\Delta T$. Since the pulses are aided and retarded by the same component V, a point midway between $T_D$ and $T_U$ would represent the time when a pulse would occur were $V=0$. This situation is illustrated in FIG. 3b by the dotted line pulse T occurring at the same time as pulse T in FIG. 3a. Since the time difference between $T_D$ and $T_U$ is $\Delta T$, the time difference between T and $T_D$ or $T_U$ and T is $\frac{1}{2} \Delta T$.

Basically the arrangement of FIG. 2 operates to obtain, during an Nth transmission cycle, a value indicative of $\Delta T$. Having the value indicative of $\Delta T$, a value indicative of $\frac{1}{2} \Delta T$ is obtained for use in a subsequent, preferably the Nth+1, transmission cycle. It is assumed that $\Delta T$ does not change instantaneously from cycle to cycle. The $\frac{1}{2} \Delta T$ indication is equivalent (from FIG. 3b) to the pulse $T(T=L/C)$ and is used in comparison with the marker pulse, thereby eliminating the effects of any fluid velocity.

In FIG. 2 circuit means in the form of $\Delta T$ counter 43 is responsive to the output of the VFO 32 and to the respective received pulses for providing a signal or count indicative of $\Delta T$, the difference in time occurrence of the respective received pulses. Prior to a transmission cycle, the $\Delta T$ counter 43 is reset by a signal R and the flip flops 46 and 47 are reset to the respective opposite binary states shown so that the zero signal provided by flip flop 46 blocks the AND gate 49. Upon the occurrence of the first received pulse, flip flop 46 switches to a one state to enable the AND gate 49 such that the VFO output is fed to the $\Delta T$ counter 43. Upon the occurrence of the second received pulse, flip flop 47 switches to its zero state to again block the AND gate 49 whereupon the VFO output no longer is counted and the $\Delta T$ counter 43 shuts off, with the count in the counter being indicative of the difference in time occurrence between the first and second received pulses. The $\Delta T$ counter 43 may be of the type which includes a plurality of serially connected flip flop units with a first of the flip flops being indicative of a least significant bit (LSB) and the last of the flip flops being indicative of the most significant bit (MSB) of the number stored in the counter.

Circuit means are provided in order to store an indication of $\frac{1}{2}$ the count in the $\Delta T$ counter 43. More particularly, and by way of example, the complement of $\frac{1}{2}$ the $\Delta T$ count is stored by means of the complement register 52, which may be a counter similar to the $\Delta T$ counter 43, and is operable to receive the complement signals from all the flip flops in the $\Delta T$ counter 43 except the least significant bit. The flip flop output leads are indicated by the solid line, and the complement by the dotted lines. The effect of transferring all but the least significant bit to the complement register 52 is to transfer the complement of $\frac{1}{2}$ the number in the $\Delta T$ counter 43. The transfer takes place by means of transfer gate 55 upon the reception of a transfer signal TR. Since the count in the $\Delta T$ counter 43 is indicative of $\Delta T$ and therefore of fluid velocity, the transfer gates 55 are also operable to transfer the number to the digital to analog equipment 58 which then performs the necessary operation to eliminate residual error and indicate actual fluid velocity.

At the beginning of a subsequent transmission cycle the count in the $\Delta T$ counter 43 is zero and the count in the complement register 52 is the complement of $\frac{1}{2}$ the $\Delta T$ count of a previous cycle, preferably the last cycle. The property of the complement register 52 is such that having the complement of $\frac{1}{2}$ the $\Delta T$ count it will take exactly $\frac{1}{2}$ the $\Delta T$ count number of input pulses to fill the complement register. When AND gate 49 is enabled by the receipt of the first received signal the $\Delta T$ counter 43 starts counting and in addition the VFO 32 output is conducted through AND gate 49 to AND gate 61 whereby the complement register 52 starts counting out. When the complement register 52 is full, AND gate 63 receives all one inputs and will provide an output signal indicating that the $\Delta T$ counter 43 is half full, which in turn is indicative of the T pulse of FIG. 3b. Therefore even with fluid flow a control pulse is artificially generated at a time when a pulse would be provided were there no fluid flow. The output of AND gate 63 in conjunction with the marker pulse from AND gate 38 serve as control or comparison signals for the VFO control means 33. The AND gate 63 output is also inverted by inverter 64 to block AND gate 61 so that the complement register 52 does not continue receiving the VFO output signal. At this time the $\Delta T$ counter 43 continues counting until the second received pulse.

When the $\Delta T$ counter 43 turns off due to the second received pulse, the transfer gates 55 are enabled, a digital to analog reading is performed and the complement of $\frac{1}{2}$ the $\Delta T$ count is transferred to the complement register 52 whereupon for the next cycle AND gate 63 will provide an output signal when the complement register 52 is full, which is at the same time that the $\Delta T$ counter 43 is half full.

The program counter 37 which provides the marker signal at some predetermined count, may also be utilized to control various operations such as resetting the flip flops 46 and 47 and the $\Delta T$ counter 43, in addition to initiating sequential transmission cycles.

Accordingly, there has been provided for use in a fluid velocity measuring system, apparatus which obtains an accurate indication of the fluid velocity and in addition constantly and automatically corrects for any variation in speed of sound in the fluid under measurement, regardless of the fluid velocity. Although the present invention has been described with a certain degree of particularity it is to be understood that various modifications of the combination and arrangement of circuit means may be resorted to.

What is claimed is:

1. In a fluid velocity measuring system, including first and second opposed transducer stations, and which operates in transmission cycles wherein during each transmission cycle acoustic energy is propagated through the fluid under measurement toward the opposed transducer stations which upon receipt of the acoustic energy provides respective first and second received pulses, the difference in time occurrence of the respective received pulses being indicative of fluid velocity, the improvement comprising in combination:

(A) variable signal means,
  (B) first circuit means responsive to the variable signal means for providing a marker signal during a transmission cycle;
  (C) second circuit means responsive to the first and second received signals for obtaining a first signal indicative of the difference in time occurrence $\Delta T$ of the first and second received signals during a transmission cycle, (D) third circuit means for obtaining and storing a second signal indicative of one half of said first signal during a transmission cycle for comparison with a marker signal in a subsequent transmission cycle, said third circuit means being operable to provide an indication of said second signal during said subsequent transmission cycle; and
(E) means for comparing, during a transmission cycle, the time occurrence of
  (1) said marker signal and
  (2) an indication of the second signal of a previous transmission cycle for controlling said variable signal means.

2. Apparatus according to claim 1 wherein:
(A) the variable signal means is a variable frequency oscillator means;
(B) the first circuit means includes first counter means responsive to the variable frequency oscillator output and operable to provide a marker pulse output signal when a predetermined count is attained;
(C) the second circuit means includes second counter means responsive to the variable frequency output and the respective received pulses for providing a count indicative of the difference in time occurrence of the respective received pulses, during a transmission cycle; and
(D) the third circuit means includes circuit means for storing an indication of one half the count in said second counter means and operable in response to the variable frequency oscillator output signal during a subsequent transmission cycle to provide a comparison output signal when the count in said second counter means reaches one half of the count attained during a previous transmission cycle.

3. Apparatus according to claim 2, wherein the circuit means includes:
(A) third counter means;
(B) transfer means for transferring the complement of one half the count in said second counter means to the third counter means;

(C) means for providing said third counter means with the variable frequency output only when said third counter means is less than full;
(D) said third counter means being operable to provide the comparison output signal when full.

4. Apparatus according to claim 3 which includes:
(A) first gating means responsive to the count in the third counter means for providing the comparison output signal when the third counter means is full; and wherein
(B) the means for providing, recited in paragraph (C) of claim 3 includes second gating means responsive to the comparison output signal provided by said first gating means and the variable frequency oscillator signal for providing the third counter means with the variable frequency oscillator output for a time period commencing with the first received pulse and ending when the comparison output signal is provided by the first gating means.

5. Apparatus according to claim 3 which includes:
(A) digital to analog converter means and wherein;
(B) the transfer means is operable to transfer the count in the second counter means to the analog to digital converter means simultaneously with the transfer of the complement of one half the count in the second counter means to the third counter means.

6. Apparatus according to claim 2, wherein the indication of one half the count in the second counter means is stored during an Nth transmission cycle and the comparison output signal is provided during the $N\text{th}+1$ transmission cycle.

References Cited
UNITED STATES PATENTS

| | | | |
|---|---|---|---|
| 2,753,542 | 7/1956 | Rod et al. | 73—290 XR |
| 3,336,801 | 8/1967 | Snavely | 73—194 XR |

CHARLES A. RUEHL, *Primary Examiner.*